Patented Jan. 2, 1940

2,185,864

UNITED STATES PATENT OFFICE 2,185,864

STABLE UREA-CHLORINE COMPOUND AND PROCESS FOR MAKING SAME

Irving E. Muskat, Akron, and Fred C. Trager, Barberton, Ohio, assignors to Pittsburgh Plate Glass Company, Allegheny County, Pa., a corporation of Pennsylvania No Drawing. Application October 28, 1937, Serial No. 171,516

7 Claims. (Cl. 260—553)

This invention relates to the preparation of organic chlorine compounds containing large amounts of active chlorine and is particularly related to chlorinated urea products.

It is very desirable for many purposes, as for example, in the bleaching industry to obtain compounds which will, under proper conditions, give up large quantities of active chlorine. The compounds, calcium oxychloride and calcium hypochlorite are perhaps the best known materials having this characteristic. Various other compounds have been investigated, and certain of these have been found to be commercially acceptable, but in general, it is found that the majority of solid chlorinated compounds are either too insoluble, contain too little active chlorine, or are too unstable for commercial use.

In accordance with our invention, it has been discovered that certain urea derivatives may be chlorinated to produce compositions which contain sufficient active chlorine, and are sufficiently stable and water soluble for use as a satisfactory source of active chlorine.

It has been found that if urea and hydrochloric acid are mixed together and evaporated to dryness, the resultant product may be chlorinated and a composition of high stability containing upwardly of 50 percent active chlorine is obtained. Samples of this material, containing 62 percent active chlorine when prepared, were tested many months later and found to contain in excess of 60 percent active chlorine.

The following is an example:

60 parts by weight of urea was added to 85 cc. of 12 N hydrochloric acid and the mixture was evaporated to dryness, the final evaporation being carried out in a vacuum. A white water soluble product which was stable at relatively high temperatures was produced. 20 parts by weight of the white reaction product were added to 200 parts water and chlorinated at 0° C. and a product containing 52 percent active chlorine was separated, accompanied by the formation of a small amount of a heavy yellow oil.

19 parts of the white reaction product were added to water and chlorinated at 0° C. in the presence of 30 parts of zinc oxide and a product containing 62 percent active chlorine was separated. A similar product was prepared using calcium carbonate in place of zinc oxide.

In each case the chlorinated product was very stable and after a period of many months lost no substantial quantity of its active chlorine. The product was also fairly soluble in water and very soluble in an alkaline solution.

In some cases it may be desirable to recrystallize the hydrochloric acid-urea reaction product before chlorination. Under such conditions the product may be recrystallized first from water and then from alcohol. The crystals obtained from this treatment may be chlorinated in an aqueous medium and a product containing 71-96 percent available chlorine may be obtained.

The quantities of urea and hydrochloric acid may be varied to a considerable extent but successful results may be obtained by using molecular proportions of each. During chlorination of the urea-hydrochloric acid reaction product, the mixture should be kept cool and it is found that very effective results may be obtained by chlorinating at or about 0° C. This temperature is not critical and some departure therefrom is permissible.

The degree of chlorination will depend largely upon the results desired. Since it is very desirable to secure high contents of active chlorine, the composition may be chlorinated until chlorine substantially ceases to be absorbed. If this is done, it may be found in some cases that the compound is super-saturated with chlorine and will lose a portion of it within a period of a few weeks. After the excess chlorine has been given up, however, the remaining material is found to contain high concentrations of active chlorine which remains constant for many months. The chlorinated product may be used for bleaching and sterilizing purposes. Other uses will occur to those skilled in the art.

Although the present invention has been described in connection with the specific details of certain embodiments thereof, it is not intended that such details shall be regarded as limitations upon the scope of the invention except insofar as included in the accompanying claims.

We claim:

1. A method of preparing a compound of high active chlorine content comprising evaporating a mixture of urea and hydrochloric acid to substantial dryness and chlorinating the resultant product.

2. A method of preparing a compound of high active chlorine content comprising evaporating a mixture of urea and hydrochloric acid to substantial dryness and chlorinating the resultant product at a temperature of substantially 0° C.

3. A method of preparing a compound of high active chlorine content comprising evaporating a mixture of urea and hydrochloric acid to substantial dryness, recrystallizing the resultant product and chlorinating the recrystallized product.

4. A method of preparing a compound of high active chlorine content comprising evaporating a mixture of urea and hydrochloric acid to substantial dryness, recrystallizing the resultant product and chlorinating the recrystallized product at a temperature of substantially 0° C.

5. A method of preparing a compound of high active chlorine content comprising evaporating a mixture of urea and hydrochloric acid to substantial dryness and chlorinating the resultant product in the presence of zinc oxide.

6. A method of preparing a compound of high active chlorine content comprising evaporating a mixture of urea and hydrochloric acid to substantial dryness and chlorinating the resultant product in the presence of calcium carbonate.

7. A stable white solid composition, containing not substantially less than 50 percent active chlorine which is substantially identical with the composition produced by the process of claim 1.

IRVING E. MUSKAT.
FRED C. TRAGER.